(12) United States Patent
Kim et al.

(10) Patent No.: US 10,487,437 B2
(45) Date of Patent: Nov. 26, 2019

(54) CLOTHES TREATING SYSTEM AND CONTROL METHOD THEREFOR

(71) Applicant: LG ELECTRONICS INC., Seoul (KR)

(72) Inventors: Jayoen Kim, Seoul (KR); Joohyeon Oh, Seoul (KR); Mina Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 15/325,821

(22) PCT Filed: Jun. 19, 2015

(86) PCT No.: PCT/KR2015/006227
§ 371 (c)(1),
(2) Date: Jan. 12, 2017

(87) PCT Pub. No.: WO2016/017925
PCT Pub. Date: Feb. 4, 2016

(65) Prior Publication Data
US 2017/0175317 A1    Jun. 22, 2017

(30) Foreign Application Priority Data

Aug. 1, 2014  (KR) .................. 10-2014-0098815
Aug. 1, 2014  (KR) .................. 10-2014-0098817

(51) Int. Cl.
*D06F 39/00*    (2006.01)
*D06F 33/02*    (2006.01)
(Continued)

(52) U.S. Cl.
CPC ............ *D06F 39/005* (2013.01); *D06F 33/02* (2013.01); *G05B 19/04* (2013.01); *G06F 3/01* (2013.01);
(Continued)

(58) Field of Classification Search
CPC ...... D06F 39/005; D06F 3/02; D06F 2202/00; D06F 2210/00; D06F 2214/00; D06F 2216/00; D06F 2220/00; G05B 19/04; G05B 2219/31197; G06F 3/01; H04L 12/2823; H04L 2012/2841; H04L 2012/285
USPC ....................................................... 68/12.23
See application file for complete search history.

(56) References Cited

U.S. PATENT DOCUMENTS

2010/0286801 A1  11/2010  Yum et al.
2012/0056827 A1   3/2012  Kim et al.
2012/0110747 A1   5/2012  Yum et al.

FOREIGN PATENT DOCUMENTS

CN        1343806     4/2002
CN      102422546    4/2012
(Continued)

OTHER PUBLICATIONS

WO2012095390A1—with machine translation (Year: 2012).*
(Continued)

*Primary Examiner* — Michael E Barr
*Assistant Examiner* — Tinsae B Ayalew
(74) *Attorney, Agent, or Firm* — Ked & Associates, LLP

(57) ABSTRACT

The present invention relates to a clothes treating system and a control method therefore and, more particularly, to a clothes treating system comprising an external terminal and a clothes treating device formed to be able to communicate with the external terminal, wherein the clothes treating device comprises a power input unit, a course selection unit formed for selecting a course among preconfigured courses, and an execution input unit for driving the clothes treating device according to the selected course; and the external terminal is formed to display information on an external environment and one or more recommended courses preconfigured on the basis of the information on the external environment, after power is input to the clothes treating device and before an execution command is input through the execution input unit.

13 Claims, 11 Drawing Sheets

(51) Int. Cl.
  *G05B 19/04* (2006.01)
  *G06F 3/01* (2006.01)
  *H04L 12/28* (2006.01)

(52) U.S. Cl.
  CPC ...... *H04L 12/2823* (2013.01); *D06F 2202/00* (2013.01); *D06F 2210/00* (2013.01); *D06F 2214/00* (2013.01); *D06F 2216/00* (2013.01); *D06F 2220/00* (2013.01); *G05B 2219/31197* (2013.01); *H04L 2012/285* (2013.01); *H04L 2012/2841* (2013.01)

(56) References Cited

FOREIGN PATENT DOCUMENTS

| CN | 103276557 | 9/2013 |
|---|---|---|
| CN | 103668859 | 3/2014 |
| EP | 2 426 244 | 3/2012 |
| KR | 10-0413291 | 12/2003 |
| KR | 10-2010-0122030 | 11/2010 |
| KR | 10-2013-0021280 | 3/2013 |
| KR | 10-2013-0090252 | 8/2013 |
| KR | 10-2014-0038738 | 3/2014 |
| WO | WO 2010/131817 | 11/2010 |

OTHER PUBLICATIONS

CN102383287A—with machine translation (Year: 2012).*
Chinese Office Action dated Aug. 3, 2018 issued in CN Application No. 201580041064.9.
International Search Report (with English translation) and Written Opinion dated Sep. 1, 2015 issued in Application No. PCT/KR2015/006227.
European Search Report dated Feb. 5, 2018 issued in Application No. 15826621.3.

* cited by examiner

Fig.2
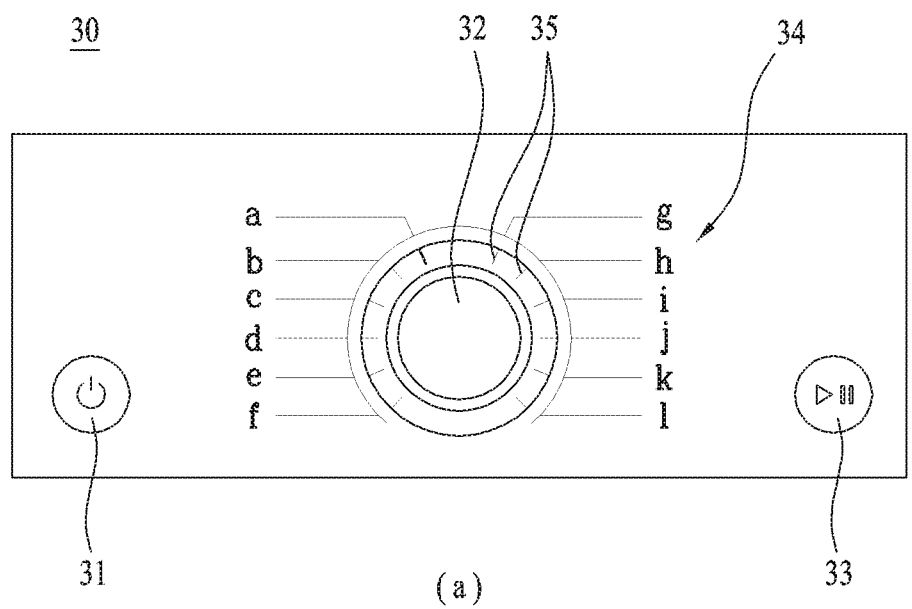
(a)
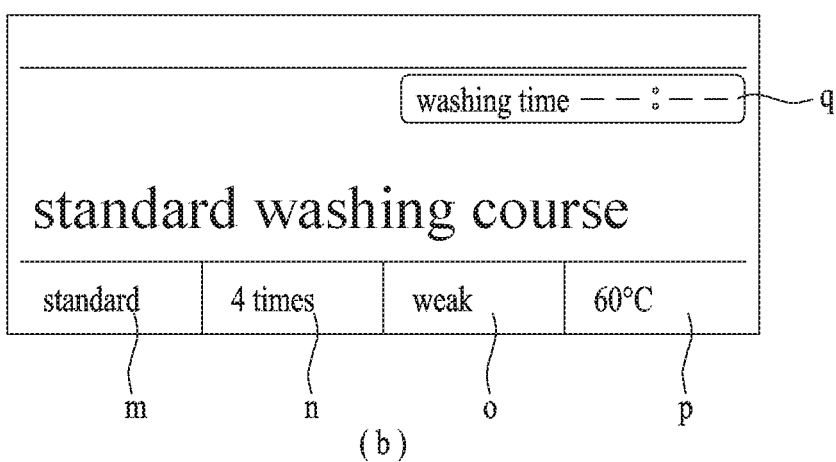
(b)

CLOTHES TREATING SYSTEM AND CONTROL METHOD THEREFOR

This application is a U.S. National Stage Application under 35 U.S.C. § 371 of PCT Application No. PCT/KR2015/006227, filed Jun. 19, 2015, which claims priority to Korean Patent Application Nos. 10-2014-0098815 and 10-2014-0098817, both filed Aug. 1, 2014, whose entire disclosures are hereby incorporated by reference.

TECHNICAL FIELD

The present invention relates to a clothes treating system and a control method therefore, and more particularly, to a clothes treating system and a control method therefore, in which information of one or more recommended courses according to an external environment such as humidity, temperature and dust concentration may be received through an external terminal which performs communication with a clothes treating device (particularly, washing machine), and description of a method for using a clothes treating device (particularly, washing machine) may be provided to a user in real time through an external terminal which performs communication with the clothes treating device.

BACKGROUND ART

Generally, a clothes treating device includes a washing machine, a dryer, and a styler, wherein the washing machine may include a drying function. Also, the washing machine may be categorized into a pulsator washing machine in which a drum is arranged in a vertical direction, and a drum washing machine in which a drum is arranged in a horizontal direction.

The washing machine may be driven by a course desired by a user among a plurality of courses through manipulation of a course selection unit provided outside the washing machine after washing targets and laundry detergent are put into the washing machine. The plurality of courses may include a standard washing course, a steam washing course, an allergy care course, a baby clothes course, a boiling course, a speed wash course, a lingerie course, and a bedding course.

The respective courses provided in the course selection unit may be provided with predetermined setup factors such as washing strength, washing time, rinsing strength, rinsing time, dehydrating strength, dehydrating time, steam supply, and drying time. The setup factors may be varied by a user.

However, when the plurality of courses are provided in the course selection unit, a problem occurs in that the user has a difficulty in determining which course and setup factors are appropriate depending on an external environment such as season or weather. Also, although the user recognizes the need of washing of a tub or a drum of the clothes treating device, a problem occurs in that the user has a difficulty in determining when and how often the tub or the drum should be washed.

Also, although the recent clothes treating device (particularly, washing machine) generally includes a drying function, a problem occurs in that the user has a difficulty in determining which drying mode of indoor drying of clothes, outdoor drying of clothes and drying based on a drying function of the clothes treating device is preferably required. Also, a problem occurs in that the user has a difficulty in determining the amount of a laundry detergent which should be put into the clothes treating device.

Also, when the plurality of courses are provided in the course selection unit, a problem occurs in that the user has a difficulty in identifying a function and washing effect according to each course. Of course, although there is a manual text (that is, manual brochure) for describing functions and effects of the clothes treating device, inconvenience is caused for the user if the user should read the manual text whenever using each course of the clothes treating device.

Also, even though the user uses the same course repeatedly, there is inconvenience that the user should again read the manual text as far as the user does not remember the function and effect of the corresponding course. Also, in putting a laundry detergent into the clothes treating device, a problem occurs in that the user has a difficulty in easily determining the proper amount of a laundry detergent which should be put into the clothes treating device.

DISCLOSURE

Technical Problem

The present invention is devised to solve the above problems, and an object of the present invention is to provide a clothes treating system and a control method therefore, in which a user can easily determine a proper course in accordance with an external environment such as season or weather through information of a recommended course displayed on an external terminal when a plurality of courses are provided in a course selection unit of the clothes treating device. Another object of the present invention is to provide a clothes treating system and a control method therefore, in which a user can easily determine a washing timing of a tub or a drum through information related to washing of the tub or the drum, which is displayed on an external terminal.

Also, still another object of the present invention is to provide a clothes treating system and a control method therefore, in which a user can easily select an optimal drying mode through an external terminal which displays information of a drying mode in accordance with weather or season. Also, further still another object of the present invention is to provide a clothes treating system and a control method therefore, in which a user can easily determine the required amount of a laundry detergent through an external terminal which guides the proper amount of the laundry detergent, which should be put into a clothes treating device, on the basis of the amount of clothes and a use history of the clothes treating device by the user.

Moreover, further still another object of the present invention is to provide a clothes treating system and a control method therefore, in which a display unit provided outside the conventional clothes treating device may be replaced with a display unit of an external terminal such as a smart phone. Also, further still another object of the present invention is to provide a clothes treating system and a control method therefore, in which a user can identify information on functions and effects of each of a plurality of courses provided in a clothes treating device through a real time manual displayed on an external terminal even though the user does not read a manual text.

Also, further still another object of the present invention is to provide a clothes treating system and a control method therefore, in which description of a selected course is displayed on an external terminal in real time to improve user convenience when a user selects one of a plurality of courses provided in a clothes treating device. Also, further still another object of the present invention is to provide a clothes treating system and a control method therefore, in which description of a course displayed on an external terminal is supported by voice as well as text to improve user convenience.

Technical Solution

To achieve the aforementioned objects of the present invention, in a clothes treating system comprising an external terminal and a clothes treating device formed to be able to communicate with the external terminal, the clothes treating device comprises a power input unit, a course selection unit formed to select one of predetermined courses, and an execution input unit for driving the clothes treating device in accordance with the selected course, wherein the external terminal is formed to display information on an external environment and one or more recommended courses previously set on the basis of the information on the external environment, after a power source is input to the clothes treating device and before an execution command is input through the execution input unit. Also, the clothes treating device may comprise a holder unit for holding the external terminal.

At this time, the clothes treating device may be powered ON if a power source is input through the power input unit or the external terminal is held in the holder unit. Also, each of the clothes treating device and the external terminal may include an NFC module for NFC communication. At this time, if the clothes treating device and the external terminal are located within a predetermined distance, the clothes treating device may be powered ON by NFC communication between the clothes treating device and the external terminal.

The clothes treating device may further include a cabinet forming external appearance, a tub received in the cabinet, and a drum rotatably provided inside the tub. Also, the external terminal may be formed to receive at least one of a washing timing of the tub or the drum, which is most recently performed, and the number of driving times of the clothes treating device, which is performed until now, from the clothes treating device through NFC communication and display the received information.

Also, the external terminal may be formed to display information on the need of washing of the tub or the drum on the basis of at least one of the washing timing and the number of driving times of the clothes treating device. Also, the information on the external environment may include at least one of season, weather, humidity, temperature, dust concentration and pollen index.

Also, the external terminal may be formed to display drying recommended information on one of indoor drying, outdoor drying and drying based on a drying function of the clothes treating device and information on the possibility of allergy, on the basis of the information on the external environment. Also, the clothes treating system according to the embodiment of the present invention may further comprise an external server for storing data of the information on the external environment and data on the previously set one or more recommended courses according to the external environment, wherein the external terminal may be formed to enable Wi-Fi communication with the external server, and may be formed to receive the data of the information on the external environment and the data on the previously set one or more recommended courses according to the external environment from the external server.

Also, the information on the external environment and the previously set one or more recommended courses according to the external environment may be displayed on the external terminal before the course selection unit is manipulated by a user. Meanwhile, according to the embodiment of the present invention, the external terminal may be formed to display information on the course selected in accordance with a manipulation of the course selection unit on the display unit.

At this time, the information on the course may include at least one of detailed description of the course selected through the course selection unit, clothes treating effect by the selected course, notes during clothes treating according to the selected course, and clothes treating prediction time according to the selected course. Also, the information on the course may be displayed on the display unit in accordance with the manipulation of the course selection unit in real time.

Meanwhile, a use history of the clothes treating device may be displayed on the external terminal if driving of the clothes treating device is completed. At this time, the use history of the clothes treating device may include at least one of information on energy consumption, water consumption and the amount of a detergent at a use date of the clothes treating device, information on energy consumption, water consumption and a frequently selected course for a predetermined period, and information on energy consumption, water consumption and a frequently selected course according to season.

Also, according to the present invention, in a control method of a clothes treating system, which is intended to control the clothes treating system comprising an external terminal, a holder unit for holding the external terminal, a power input unit, a course selection unit formed to select one of previously set courses, an execution input unit, and a controller, formed to be able to communicate with the external terminal, the control method comprises the steps of a power input step for inputting a power source to the clothes treating device; an external terminal executing step for executing a clothes treating application provided in the external terminal; a course selecting step for selecting a course through the course selection unit; and an executing step for inputting an execution command through the execution input unit, wherein a desired one of the one or more recommended courses displayed on the external terminal is selected at the course selecting step. At this time, the one or more recommended courses may be previously set courses based on information on an external environment that includes at least one of season, weather, humidity, temperature, dust concentration and pollen index.

Also, the external terminal executing step may include executing a clothes treating application; logging in an external server through the external terminal; receiving the information on the external environment and information on one or more recommended courses from the external server to the external terminal; and displaying the information, which is received in the external terminal from the external server, on the external terminal. Also, the control method of the clothes treating system may further comprise a real time display step for displaying an operation state of the clothes treating device on the external terminal in real time after the executing step.

Meanwhile, the control method of the clothes treating system may further comprise a time display step for displaying a clothes treating time according to the course selected at the course selecting step on the external terminal and a time change step for changing a clothes treating end time through a touch and drag of the time displayed on the external terminal, between the course selecting step and the executing step.

Advantageous Effects

According to the present invention, a user can easily determine a proper course in accordance with an external environment such as season or weather through information of a recommended course displayed on an external terminal when a plurality of courses are provided in a course selection unit of the clothes treating device.

Also, according to the present invention, the user can easily determine a washing timing of a tub or a drum through information related to washing of the tub or the drum, which is displayed on an external terminal. Also, according to the present invention, the user can easily select an optimal drying mode through an external terminal which displays information of a drying mode in accordance with weather or season.

Also, according to the present invention, the user can easily determine the required amount of a laundry detergent through an external terminal which guides the proper amount of the laundry detergent, which should be put into a clothes treating device, on the basis of the amount of clothes and a use history of the clothes treating device by the user. Also, according to the present invention, a display unit provided outside the conventional clothes treating device may be replaced with a display unit of an external terminal such as a smart phone.

Also, according to the present invention, the user can identify information on functions and effects of each of a plurality of courses provided in a clothes treating device through a real time manual displayed on an external terminal even though the user does not read a manual text. Also, description of a selected course is displayed on an external terminal in real time to improve user convenience when a user selects one of a plurality of courses provided in a clothes treating device. Also, description of a course displayed on an external terminal is supported by voice as well as text to improve user convenience.

BRIEF DESCRIPTION OF THE DRAWINGS

FIG. 2 shows views illustrating one embodiment of a course selection unit and a display unit, which are provided in a clothes treating device of FIG. 1.

BEST MODE FOR CARRYING OUT THE INVENTION

Hereinafter, the preferred embodiments of the present invention, which can achieve the above objects in detail, will be described with reference to the accompanying drawings. Although a clothes treating device which will be described hereinafter includes a washing machine, a dryer, and a styler, a washing machine, which includes a drying function, will mainly be described.

Figure 1:
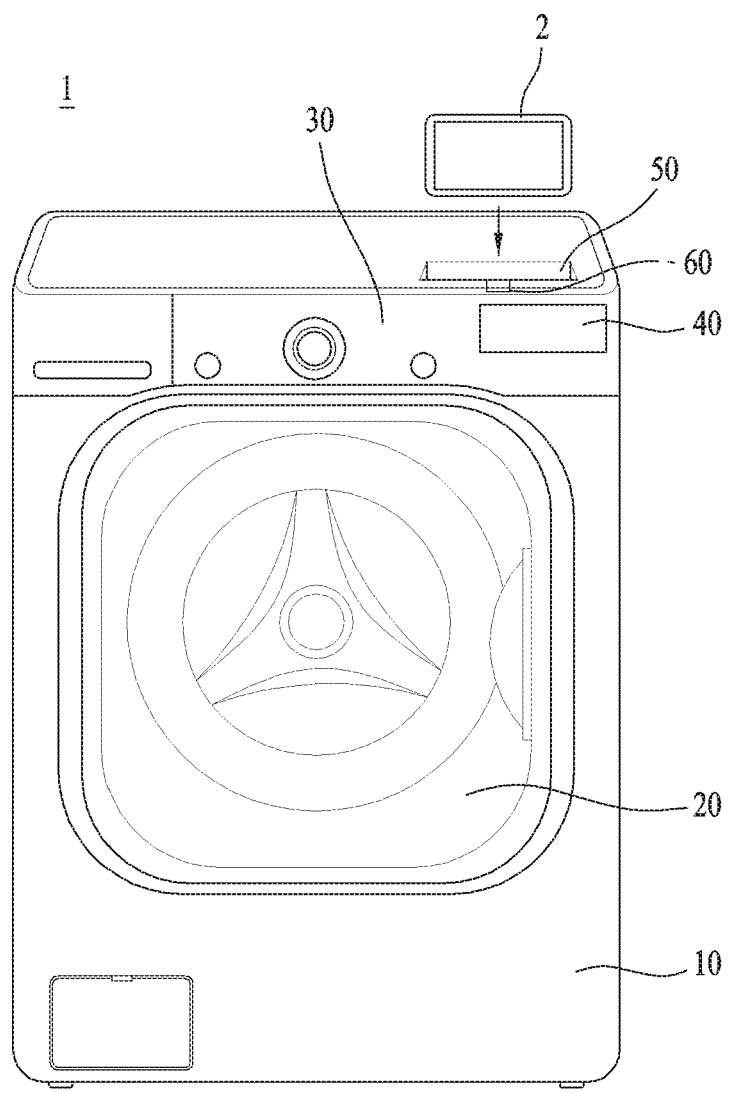
FIG. 1 is a front view illustrating a clothes treating device included in a clothes treating system according to the present invention.

Referring to FIGS. 1 and 2, a clothes treating device 1 may include a cabinet 10 forming external appearance, a door 20 that may be opened to receive clothes in the cabinet 10, a main course selection unit (of course selection panel) 30 provided on an outer surface of the cabinet 10, and a holder unit (or holder) 50 for holding an external terminal 2, which will be described later. Also, the clothes treating device 1 may further include a display unit (or display) 40 where an operation state of the clothes treating device 1 is displayed. The display unit 40 may be formed to allow a user to input setup factors such as washing strength, the number of rinsing times and dehydrating strength.

The holder unit 50 may be formed in a concave shape on an upper surface of the clothes treating device 1 to allow at least a part of the external terminal 2 described with reference to FIG. 4 to be inserted thereinto. However, the holder unit 50 is not limited to the concave shape, and may be formed in a shape of a bracket for supporting the external terminal 2.

Also, in the shown embodiment, the holder unit 50 is provided on, but not limited to, the upper surface of the clothes treating device 1. For example, the holder unit 50 may be provided at a front side or a lateral side of the clothes treating device 1.

The door 20 is provided on a front surface of the cabinet 10, and may be formed to be opened through up-and-down rotation or left-and-right rotation. A plurality of courses a to l for driving the clothes treating device 1 may be displayed on the course selection unit 30. Also, one course selected by the main course selection unit 30 and additional setup factors for executing the selected course may be displayed on the display unit 40.

At this time, the setup factors may include the number of rinsing times, dehydrating strength and a water (washing water and rinsing water) temperature. These setup factors may be input, re-input or change-input through the display unit 40.

Meanwhile, the course selection unit 30 may include a power input unit (or power button) 31 for supplying a power source to the clothes treating device, a manipulation unit (or selector) 32 formed to select one of the plurality of courses a to l, and an execution input unit (or execution button) 33 for executing the selected course through the manipulation unit 32. At this time, the plurality of courses a to l may be displayed along the circumference of the manipulation unit 32.

To use the clothes treating device, a user may supply a power source to the clothes treating device by pushing a power button through the power input unit 31. Meanwhile, the holder unit 50 may be provided with a sensor 60 electrically connected with the power input unit 31. Therefore, if the external terminal 2 is held in the holder unit 50, the sensor 60 may be formed such that the power source of the clothes treating device 1 is turned ON even though the power input unit 31 is not input.

Also, the course selection unit 30 may be provided with a plurality of indicator lights 35 between the manipulation unit 32 and the plurality of courses a to l. Also, the plurality of indicator lights 35 may respectively be provided at positions corresponding to the plurality of courses a to l between the manipulation unit 32 and the plurality of courses a to l.

The manipulation unit 32 may be formed in a rotatable rotary knob shape. That is, the user may select one of the plurality of courses a to l displayed on the course selection unit 30 by rotating the rotary knob shaped manipulation unit 32.

In more detail, the plurality of courses a to l may be displayed on the course selection unit 30 along the circumference of the manipulation unit 32, and the user may select one of the plurality of courses a to l by rotating the manipulation unit 32. For example, as the manipulation unit 32 provided in the course selection unit 30 is rotated, the indicator lights 35 provided at the positions corresponding to the plurality of courses a to l may be lighted (or activated) in due order.

At this time, after rotating the manipulation unit 32 until the indicator light 35 provided at the position corresponding to a desired one of the plurality of courses a to l is lighted, the user may drive the clothes treating device 1 by inputting (for example, pushing an execution button) an execution command to the execution input unit 33. Meanwhile, when the user rotates the manipulation unit 32, the indicator lights 35 may be formed to be selectively lighted sequentially or selectively by a light emitting unit 820 (see FIG. 4) provided on a rear surface of the course selection unit 30. Also, lighting of the indicator lights 35 may be controlled through a controller 810 which will be described later with reference to FIG. 4.

Also, referring to FIG. 2(b), the setup factors such as washing strength 'm', the number of rinsing times 'n', dehydrating strength 'o', water (washing water/rinsing water) temperature 'p', and washing time 'q' may be displayed on the display unit 40. The display unit 40 may be formed in a touch screen shape that may input or change information of the setup factors through a touch based on a finger of the user.

Therefore, the user may input or change the setup factors such as washing strength 'm', the number of rinsing times 'n', dehydrating strength 'o', and water temperature 'p'. through the display unit 40. For example, the plurality of courses a to l provided in the main course selection unit 30 have setup factors previously set in accordance with the respective courses. That is, the setup factors such as washing strength 'm', the number of rinsing times 'n', dehydrating strength 'o', and water temperature 'p' are previously determined in each course.

Hereinafter, the setup factors which are previously determined in accordance with each course will be referred to as "standard setup factors". Therefore, if the user selects a desired course from the main course selection unit 30, the setup factors (that is, standard setup factors) corresponding to the selected course may be displayed on the display unit 40. At this time, the user may drive the clothes treating device 1 in accordance with the standard setup factors by directly inputting an execution command to the execution input unit 33 or drive the clothes treating device 1 by inputting the execution command to the execution input unit 33 after changing the setup factors displayed on the display unit 40.

Figure 3:
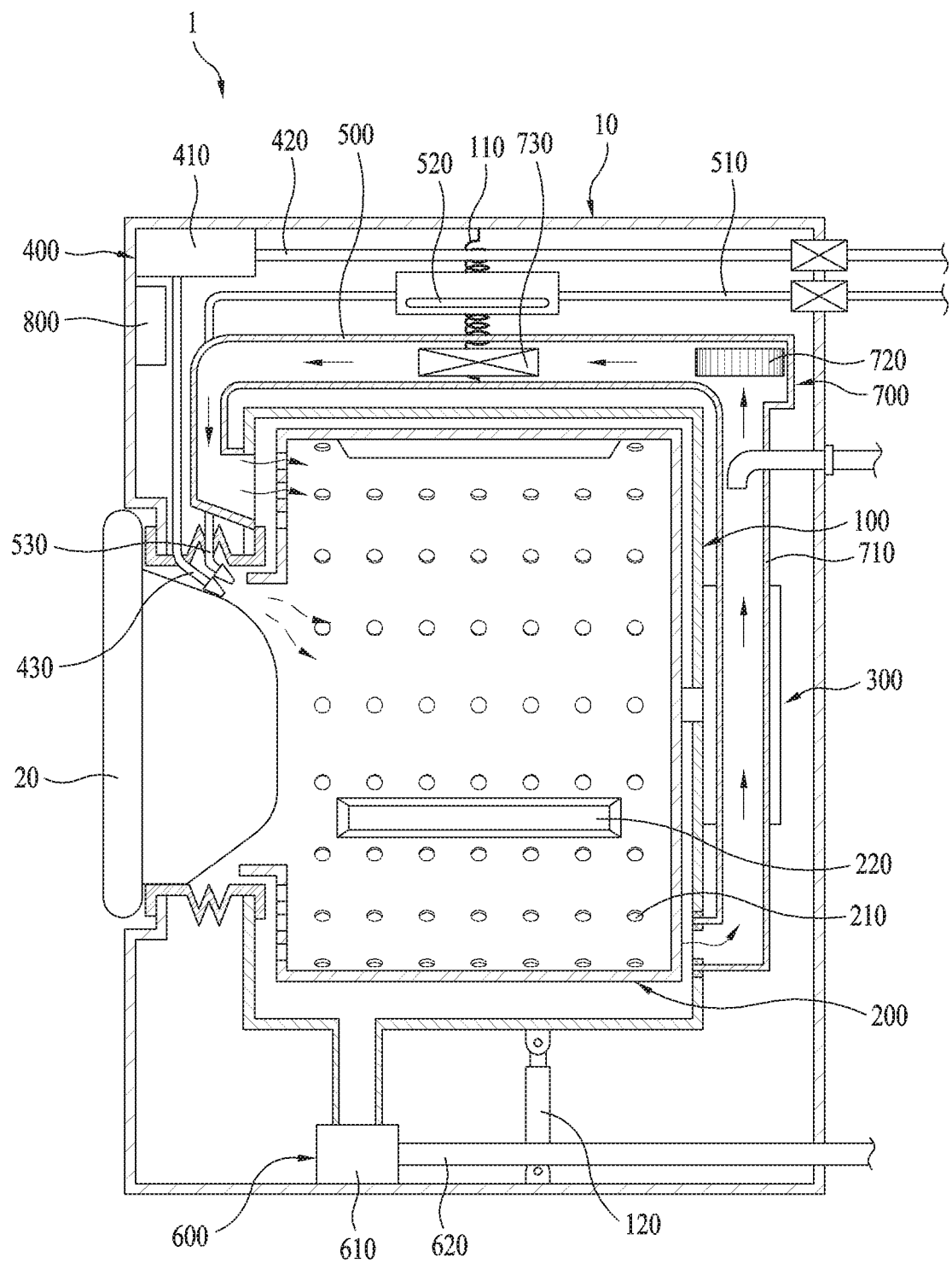
FIG. 3 is a side cross-sectional view illustrating a clothes treating device included in a clothes treating system according to the present invention.

Hereinafter, detailed elements of the clothes treating device included in the clothes treating system will be described with reference to another drawing. FIG. 3 is a side cross-sectional view illustrating a clothes treating device included in a clothes treating system according to the present invention.

Figure 4:
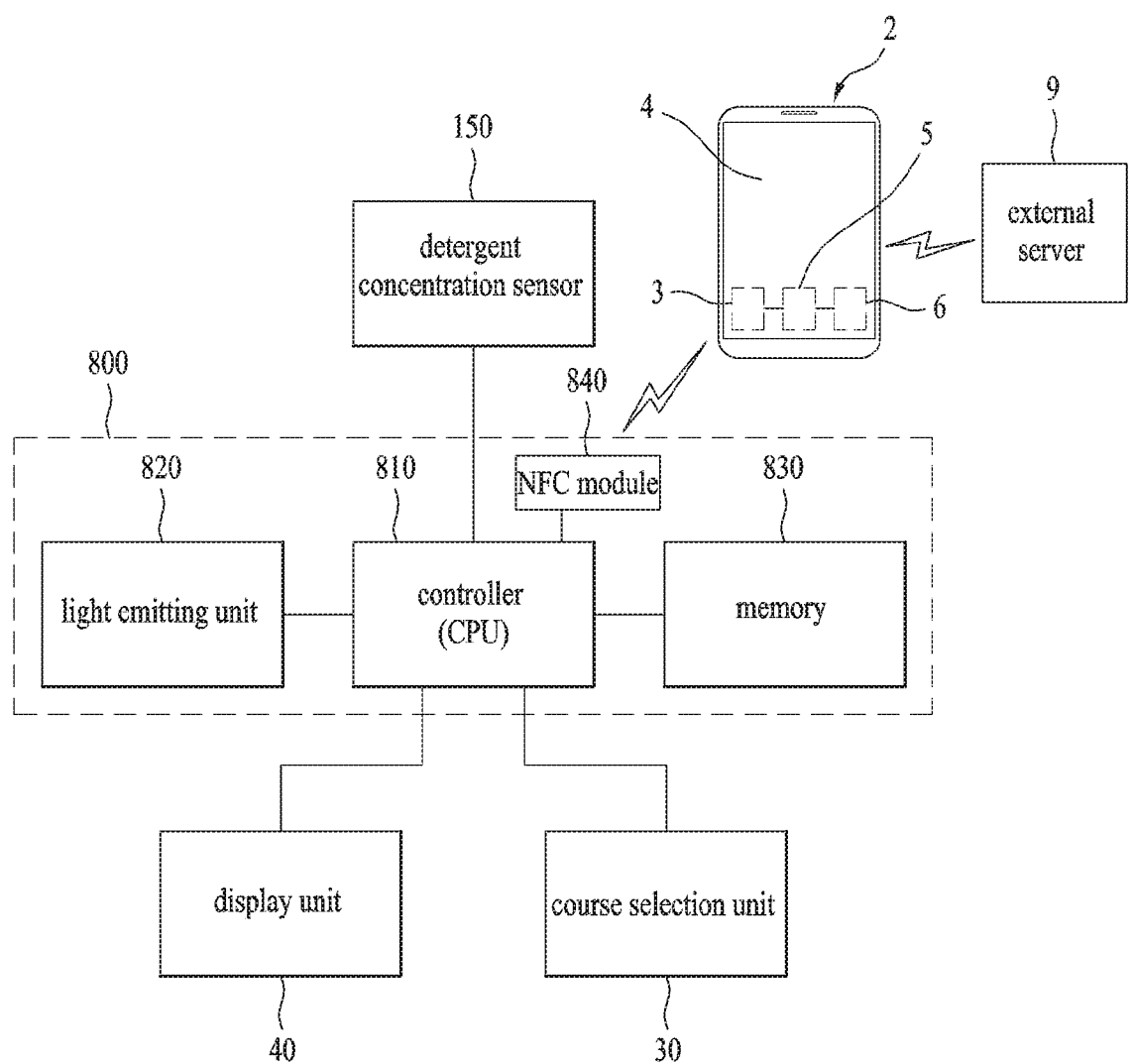
FIG. 4 is a block diagram briefly illustrating a communication relation among a control unit of a clothes treating device, an external terminal and an external server.

Referring to FIG. 3, the clothes treating device (washing device) 1 may include a cabinet 10 forming external appearance, a tub 100 provided inside the cabinet 10, a detergent concentration sensor 150 provided in an inner circumference of the tub 100, a drum 200 provided to be axially rotated inside the tub 100, receiving clothes therein, a driving unit (or motor) 300 giving a rotational force to the drum 200, a detergent jet unit (or detergent device) 400 jetting a detergent into the drum 200 in which clothes are received, a steam jet unit (or stream jet device) 500 jetting a steam into the drum 200, a discharge unit (or drain) 600 for discharging out washing water or rinsing water, an air circulating unit (or system) 700 circulating the hot air or the cool air inside the tub 100, a control unit (or controller) 800 for operating the clothes treating device 1 by controlling each element, and a course selection unit 30 and a display unit, which are associated with the control unit 800 to input a command for controlling each element (see FIG. 4). The cabinet 10 forms external appearance of the washing device 1 according to this embodiment, and various elements are mounted at an inner side and an outside of the cabinet 10. A door 20 for putting clothes into the drum is rotatably provided at the front of the cabinet 10.

The tub 100 is provided at the inner side of the cabinet 10, and has a cylindrical shape opened toward the door 20 provided in the cabinet 10. The tub 100 prevents the detergent from being leaked and at the same time is rotatably fixed to the drum 200.

In this case, the tub 100 is elastically supported by an upper spring 110 and a lower damper 120. The spring 110 and the damper 120 buffer and reduce transfer of vibration to the cabinet 10 through the tub 100, wherein the vibration is generated by rotation of the drum 200 in accordance with the operation of the driving unit 300.

The drum 200 is rotatably provided at the inner side of the tub 100. Clothes put toward the door 20 are stacked at the inner side of the drum 200. The drum 200 is provided with a plurality of drainage holes 210. A plurality of protrusions 220 are formed at the inner side of the drum 200, wherein the protrusions hold the clothes stacked in the drum 200 when the drum is rotated 200 and drop the clothes after ascending the clothes. Mixing performance of the detergent and the clothes may be improved by movement of the clothes by the protrusions 220.

Also, the driving unit 300 for rotating the drum 200 is mounted on the rear surface of the tub 20. The driving unit 300 is formed of a motor to rotate the drum 200. The rotational speed of the driving unit 300 is controlled under the control of the control unit 800. A structure and type of the driving unit 300 is widely known to the person skilled in the art, and their various embodiments can be achieved and thus their detailed description will be omitted.

The detergent jet unit 400 is provided outside the tub 100, and jets the detergent toward the drum 200 located at the inner side of the tub 100. The detergent jet unit 400 jets the detergent only, or jets water, which is separately supplied, and the detergent by mixture. In this case, a functional detergent is preferably provided as a liquefied detergent that includes a water soluble component only to be dissolved in water which is supplied.

The detergent jet unit 400 includes a detergent storage tub 410 where the detergent is stored, a dilution water supply line 420 for supplying dilution water for diluting the functional detergent, a pressure pump (not shown) for supplying the functional detergent diluted by the dilution water at a predetermined pressure, and a jet nozzle 430 for jetting the functional detergent supplied by the pressure pump toward the inner side of the drum 200. The steam jet unit 500 is to improve a contaminant material binding force of the functional detergent permeated into the clothes by jetting steam of high temperature toward the clothes received in the drum 200. The steam jet unit 500 includes a steam water supply pipe 510 for supplying steam water for generating steam, a steam generator 520 for forming steam by heating the steam water supplied from the steam water supply pipe 510, and a steam jet nozzle 530 for jetting the steam generated by the steam generator 520 toward the clothes at the front of the drum 200.

The discharge unit 600 is provided at the outer side of the tub 100 to discharge washing water or rinsing water inside the tub 100. The discharge unit 600 includes a drainage pump 610 and a drainage pipe 620.

The air circulating unit 700 is provided on the outer circumference of the tub 100 to inhale the air inside the tub 100 or the external air of the clothes treating device 1, thereby circulating the hot air or the cool air toward the inner side of the tub 100. The air circulating unit 700 includes a circulating duct 710 forming a moving path to supply the air from an upper side at the front of the tub 100 to a lower side at the rear of the tub 100, a ventilating fan 720 for circulating the air inside the circulating duct 710, and a heat exchanger 730 heating or cooling the ventilated air to make the hot air or the cool air.

In this case, the heat exchanger 730 may be provided as a heating device (for example, heater, not shown) for heating the air and a cooling device (for example, thermoelectric element, not shown) for cooling the air. Also, the detergent concentration sensor 150 may be provided on the inner circumference of the tub 100. All known sensors that can sense the concentration of the detergent contained in the washing water may be used as the detergent concentration sensor 150. The detergent concentration sensor 150 may provide the concentration of the detergent contained in the washing water to the control unit 800 in real time. The control unit 800 may store information on the concentration of the detergent, which is received from the detergent concentration sensor 150, in a memory 830, which will be described later.

Meanwhile, the clothes treating system according to the present invention includes the external terminal 2 and the clothes treating device 1 formed to perform communication with the external terminal 2. Features related to communication between the external terminal 2 and the clothes treating device 1 will be described in detail with reference to FIG. 4.

FIG. 4 is a block diagram briefly illustrating a communication relation among a control unit of a clothes treating device, an external terminal and an external server. Referring to FIGS. 2 and 4, the control unit 800 provided in the clothes treating device 1 may include a controller 810 for controlling the course selection unit 30 and the display unit 40, a light emitting unit (or light emitter) 820 for sequentially or selectively lighting the indicator lights 35 displayed on the course selection unit 30, and a memory 830 for storing the information input through the course selection unit 30 and the display unit 40.

Also, the control unit 800 may be formed to perform communication with the external terminal 2. To this end, the control unit 800 and the external terminal 2 may respectively include communication modules 840 and 3. At this time, the control unit 800 and the external terminal 2 may be formed to perform NFC communication, and the communication module 840 of the control unit 800 and the communication module 3 of the external terminal 2 may be NFC modules, respectively. That is, each of the clothes treating device 1 and the external terminal 2 may include an NFC module for NFC communication.

The controller 810 receives information input to the course selection unit 30 and the display unit 40 by the user, and drives the respective elements of the clothes treating device 1 in accordance with the received information and at the same time transfers the corresponding information to the memory 830. Therefore, the information such as the number of selection times of the course selected through the course selection unit 30 and the number of input times of the setup factors input to the display unit 40 may be stored in the memory 830.

Also, the controller 810 may control the light emitting unit 820 to sequentially or selectively light the indicator lights 35 corresponding to the plurality of courses a to l displayed on the course selection unit 30. The user may select one of the plurality of courses a to l displayed on the course selection unit 30 by manipulating (i.e., rotating) the manipulation unit 32. At this time, the indicator lights 35 may be lighted sequentially in accordance with rotation of the manipulation unit 32.

For example, if the power source is input to the clothes treating device 1, the indicator light 35 provided at the position corresponding to the first course 'a' of the plurality of courses a to l provided in the course selection unit 30 may be lighted. At this time, if the user rotates the manipulation unit 32 at a predetermined angle clockwise or counterclockwise, the indicator light 35 provided at the position corresponding to another course 'b' or 'l' adjacent to the first course 'a' clockwise or counterclockwise may be lighted.

Meanwhile, the external terminal 2 may be formed to display information on an external environment and at least one or more recommended courses previously set according to the information of the external environment. For example, after the power source is input to the clothes treating device, and before the execution command is input through the execution input unit 33, the external terminal 2 may be formed to display information on an external environment and at least one or more recommended courses previously set according to the information of the external environment.

Preferably, before the course selection unit 30 is manipulated by the user, the external terminal 2 may be formed to display information on an external environment and at least one or more recommended courses previously set according to the information of the external environment. At this time, the holder unit 50 included in the clothes treating device 1 may be provided with a sensor 60 electrically connected to the power input unit 31. Therefore, if the external terminal 2 is held in the holder unit 50, the sensor 60 may be formed to turn ON the power source of the clothes treating device 1. That is, even though the power input unit 31 of the clothes treating device is not manipulated, if the external terminal 2 is held in the holder unit 50, the sensor 60 may be formed such that the power source of the clothes treating device 1 is turned ON.

That is, the power source of the clothes treating device 1 may be input through the power input unit 31 provided in the course selection unit 30 or holding of the external terminal 2 in the holder unit 50. Also, the power source of the clothes treating device 1 may be input through NFC communication between the clothes treating device 1 and the external terminal 2. That is, if the clothes treating device and the external terminal 2 are within a predetermined distance in a state that they can perform NFC communication, the power source of the clothes treating device 1 may be formed to be turned ON.

The external terminal 2 may include a display unit 4, and information related to the operation of the clothes treating device 1 may be displayed on the display unit 4. Also, the controller 810 is formed to receive information related to the concentration of the detergent contained in the washing water or the rinsing water inside the clothes treating device 1 from the detergent concentration sensor 150. For example, a washing course is performed several times, the detergent concentration sensor 150 may be formed to sense the concentration of the detergent contained in the washing water during the washing course performed finally. Likewise, when a rinsing course is performed several times, the detergent concentration sensor 150 may be formed to sense the concentration of the detergent contained in the rinsing water during the rinsing course performed finally.

At this time, the concentration of the detergent sensed by the detergent concentration sensor 150 may be stored in the memory 830. For example, a date when the clothes treating device 1 is driven and the concentration of the detergent sensed in the washing water and the rinsing water at the date may be stored together in the memory 830.

That is, the date when the clothes treating device 1 is driven and the concentration of the detergent sensed in the washing water and the rinsing water at the date may be stored in the memory 830. Meanwhile, if the clothes treating device 1 is driven several times at the same date, the date when the clothes treating device 1 is driven and the concentration of the detergent sensed in the washing water and the rinsing water at the corresponding date and time may be stored in the memory 830. Hereinafter, various embodiments of the information displayed on the display unit 4 of the external terminal 2 will be described.

Recommended Course Display According to External Environment

The external terminal 2 may be formed to display information on an external environment and at least one or more recommended courses previously set according to the information of the external environment on the display unit 4. At this time, the information on the external environment may include at least one of season, weather, humidity, temperature, dust concentration and pollen index.

The external terminal 2 may be displayed to display drying recommended information on one of indoor drying, outdoor drying and drying based on a drying function of the clothes treating device and information on the possibility of allergy, on the basis of the information on the external environment. The display unit 4 of the external terminal 2 may be formed in a touch screen shape that enables a touch input.

Therefore, the user may touch one or more recommended courses displayed on the display unit 4, and may drive the clothes treating device 1 through an input of the execution command through the execution input unit 33 provided in the clothes treating device 1. Of course, the clothes treating device 1 may be driven through a touch of an execution icon displayed on the display unit 4.

That is, the user may select a desired course through the external terminal 2 even without manipulating the course selection unit 30 provided in the clothes treating device 1. Meanwhile, the clothes treating system according to the present invention may further include an external server 9 storing data of the information on the external environment and data of at least one or more recommended courses previously set according to the external environment.

At this time, the external server 9 may be formed to update the data of the information on the external environment in real time. And, the external terminal 2 may be formed to enable Wi-Fi communication with the external server 9, and the data of the information on the external environment, which are updated by the external server 9 may be transmitted to the external terminal 2. For this Wi-Fi communication, each of the external terminal 2 and the external server 9 may include a Wi-Fi module (not shown).

That is, the external terminal 2 may be formed to receive the data of the information on the external environment and the data on one or more recommended courses previously set based on the external environment from the external server 9. At this time, data transmission from the external server 9 to the external terminal 2 may be performed in real time or time interval which is previously set.

Meanwhile, after the execution command is input through the execution input unit 33 of the clothes treating device 1, the external terminal 2 may be formed to display information on the operation state of the clothes treating device 1 in real time. In this case, the information on the operation state may include name of a course which is performed, the number of remaining rinsing times, dehydrating strength, information as to whether a steam course is performed, information as to whether a drying course is performed, and remaining washing time (that is, washing end time).

Therefore, even though the element such as the display unit 40 is not provided in the clothes treating device 1, the user may acquire the information on the operation state of the clothes treating device 1 through the external terminal 2 which performs communication with the clothes treating device 1. That is, the display unit 40 of the clothes treating device 1 may be replaced with the external terminal 2. Hereinafter, the information of the recommended course displayed on the display unit 4 of the external terminal 2 will be described exemplarily.

Display of the Need of Washing of Tub or Drum

The external terminal 2 may be formed to receive at least one of washing timing of the tub or the drum, which is most recently performed, and the number of driving times of the clothes treating device 1, which is performed until now, from the clothes treating device 1 through NFC communication and display the received information on the display unit 4. In this case, the number of driving times for washing of the tub 100 or the drum 200 is excluded (that is, not counted) from the number of driving times of the clothes treating device 1.

At this time, it is preferable that the washing timing of the tub or the drum, which is most recently performed, and the number of driving times of the clothes treating device 1, which is performed until now, are stored in the memory 830 provided in the control unit 800. That is, the controller 810 may transmit the stored information on the washing timing of the tub or the drum, which is most recently performed, and the stored information on the number of driving times of the clothes treating device 1, which is performed until now, to the external terminal 2, and the corresponding information may be displayed on the display unit 4 of the external terminal 2.

Also, the external terminal 2 may be formed to display information on the need of washing of the tub 100 or the drum 200 on the basis of at least one of the information on the washing timing of the tub or the drum, which is most recently performed, and the information on the number of driving times of the clothes treating device 1, which is performed until now. For example, the external terminal 2 may further include a memory module 6 and a control module 5. Information on a previously set washing period of the tub 100 or the drum and information on the number of driving times of the clothes treating device, which is previously set, may be stored in the memory module 6.

Therefore, if the external terminal 2 receives the information on the washing timing of the tub 100 or the drum 200, which is most recently performed, from the clothes treating device 1, the control module 5 determines whether a period from the washing timing to a current time exceeds the previously set washing period stored in the memory module 6. If the control module 5 determines that the period from the washing timing to the current time exceeds the previously set washing period stored in the memory module 6, the control module 5 displays a text (for example, "tub washing required" or "drum washing required") of the need of washing of the tub 100 or the drum 200 on the display unit 4.

At this time, the previously set washing period may previously be set to 30 days, 50 days or 100 days. Also, if the external terminal 2 receives the information on the number of driving times of the clothes treating device 1, which is performed until now, from the clothes treating device 1, the control module 5 compares the number of driving times with the number of previously set driving times stored in the memory module 6. And, the control module 5 controls the display unit 4 to display whether the number of driving times of the clothes treating device 1 is close to the number of previously set driving times stored in the memory module 6, on the display unit 4.

At this time, the number of previously set driving times may previously be set to 10 times, 30 times or 50 times. Also, after the tub 100 or the drum 200 is washed, the number of driving times of the clothes treating device 1 is again counted from the beginning (that is, from 1). By the aforementioned configuration, the user may determine whether to perform washing of the tub or the drum before washing the clothes, on the basis of the information displayed on the display unit 4 of the external terminal 2.

Reservation Setup Display

If one course is input through the course selection unit 30 of the clothes treating device 1 or information of the recommended course displayed on the external terminal 2, operation start time and operation end time of the clothes treating device 1 according to the input course are displayed on the external terminal 2 in a shape of an analog clock. Also, whole clothes treating (washing) time may be displayed in such a manner that a space between the start time and the end time, which are displayed on the display unit 4, is lighted in a fan shape.

At this time, the clothes treating end time of the clothes treating device 1 may be changed through a touch and a drag of the portion, which is lighted in a fan shape, by the user. That is, the user may control the clothes treating end time by touching and dragging the whole clothes treating time displayed on the display unit 4. Therefore, the user may easily drive the clothes treating device through reservation.

Real Time Manual Display

The external terminal 2 according to the embodiment of the present invention may be formed to display information on a course selected by manipulation of the course selection unit 30 of the clothes treating device 1 on the display unit 4. Therefore, the user may obtain information related to the course of the clothes treating device 1 through the information displayed on the external terminal 2 even without separately reading a brochure such as manual text.

The information on the course may include at least one of detailed description of the course selected through the course selection unit 30, clothes treating effect by the selected course, notes during clothes treating according to the selected course, and clothes treating prediction time according to the selected course. It is preferable that the information on the course is previously stored in the memory module 6 of the external terminal 2, and the display unit 4 may be controlled by the control module 5 of the external terminal 2.

That is, in a state that the clothes treating device 1 and the external terminal 2 perform communication with each other, a signal according to the manipulation of the course selection unit 30 of the clothes treating device 1 may be transmitted to the external terminal 2. The external terminal 2 which has received the signal according to the manipulation of the course selection unit 30 allows the information of the selected course to be displayed on the display unit 4 under the control of the control module 5.

Also, it is preferable that the information on the course is displayed on the display unit 4 of the external terminal 2 in accordance with the manipulation of the course selection unit 30 in real time. Therefore, the user may manipulate the course selection unit 30 and at the same time receive the information on each course in real time.

Meanwhile, in addition to the information on the course, setup factors, which include one or more of a contamination level, washing strength, the number of rinsing times, dehydrating strength and washing water temperature, may further be displayed on the display unit 4 of the external terminal 2. At this time, the display unit 4 may be categorized into a first display unit for displaying the information on the course and a second display unit for displaying the setup factors (see FIG. 7).

Also, the setup factors displayed on the display unit 4 may be changed by an input (that is, touch) of the user. If the setup factors are changed by the input or touch of the user for the external terminal 2, the information according to the changed setup factors may be displayed on the first display unit (see FIG. 7).

It is preferable that the information related to the setup factors is previously stored in the memory module 6 of the external terminal. Therefore, the user may easily receive information on clothes treating effect and notes according to the changed setup factors in real time while changing the setup factors through the external terminal 2.

The information according to the changed setup factors may include at least one of detailed description of the changed setup factors, clothes treating effect according to the changed setup factors, notes during clothes treating according to the changed setup factors, and clothes treating prediction time according to the changed setup factors. Meanwhile, when the information on the course and the information on the setup factors are displayed on the display unit 4, the external terminal 2 may be formed to provide the information displayed on the display unit 4 in voice.

That is, the external terminal 2 may be formed to display the information on the course and the information on the setup factors on the display unit 4 and at the same time support such information in voice. Therefore, the user may easily obtain the information on the course and the information on the setup factors through voice support even without reading a text displayed on the display unit 4.

Meanwhile, if driving of the clothes treating device 1 according to a specific course selected by the user is completed, a use history of the clothes treating device 1 may be displayed on the display unit 4 of the external terminal 2. At this time, the use history of the clothes treating device may include at least one of information on energy consumption, water consumption and the amount of the detergent at a use date of the clothes treating device, information on energy consumption, water consumption and a frequently selected course for a predetermined period, and information on energy consumption, water consumption and a frequently selected course according to season.

At this time, a page where the information according to the use date is displayed, a page where the information according to the predetermined period is displayed, and a page where the information according to season is displayed may respectively be displayed on the display unit of the external terminal as separate pages by the touch and drag of the display unit of the external terminal. That is, at least one of information on energy consumption, water consumption and the amount of the detergent at a use date of the clothes treating device, information on energy consumption, water consumption and a frequently selected course for a predetermined period, and information on energy consumption, water consumption and a frequently selected course according to season may be displayed on the display unit 4 of the external terminal 2 as different pages.

At this time, the user may change the pages of the above information through the touch and drag of the display unit 4 and receive each information. Meanwhile, the external terminal 2 may be formed to enable Wi-Fi communication with the external server 9, and may receive the information on the course and the information on the setup factors from the external server 9.

Also, the external server 9 may be formed to update the information on the course and the information on the setup factors at a predetermined period, and the information on the course and the information on the setup factors, which are updated by the external server 9, may be transmitted to the external terminal 2. The information on the course and the information on the setup factors, which are received from the external server 9 to the external terminal 2, may be stored in the memory module 6 of the external terminal 2.

Figure 5:
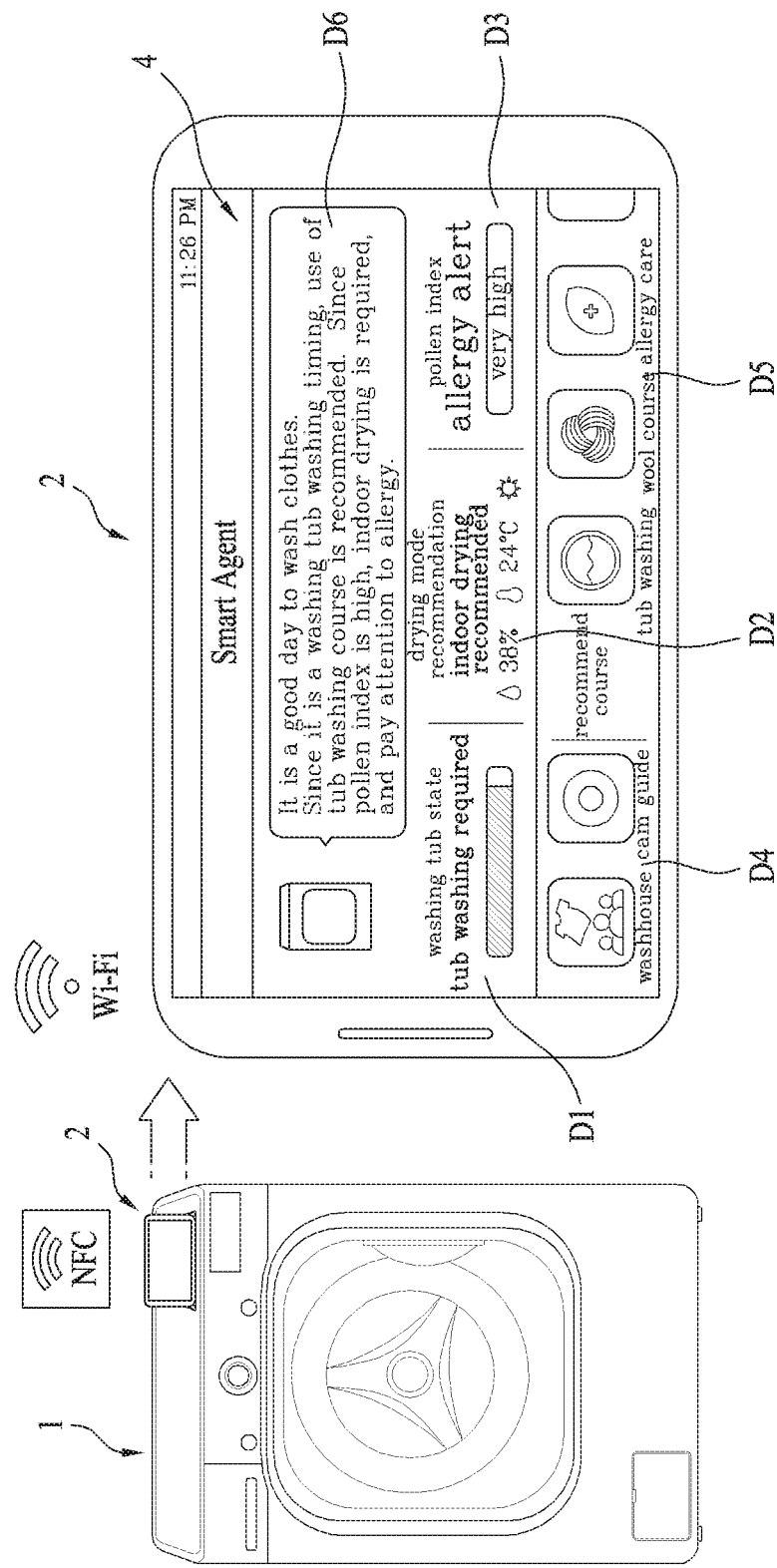
FIG. 5 is a view illustrating a state that information of a recommended course is displayed on a display unit of an external terminal according to the present invention.

Hereinafter, one embodiment of a display type of the information displayed on the display unit 4 of the external terminal 2 will be described with reference to FIGS. 5 to 8. FIG. 5 is a view illustrating a state that information of a recommended course is displayed on a display unit of an external terminal according to the present invention.

Referring to FIG. 5, the display unit 4 of the external terminal 2 may be categorized into a plurality of partitions D1, D2, D3, D4, D5 and D6. The plurality of partitions may include the first partition D1 to the sixth partition D6.

After the power source is input to the clothes treating device 1 and before the course selection unit 30 is manipulated by the user, information on an external environment and information on one or more recommended courses previously set based on the information on the external environment may be displayed on the display unit 4. The corresponding information may be displayed through NFC communication between the clothes treating device 1 and the external terminal 9.

For example, information related to a state of a washing tub (drum or tub) may be displayed on the first partition D1. In more detail, the information on the need of washing of the drum or tub may be displayed on the first partition D1 as a text "tub washing required". At this time, at least one of the washing timing of the tub or the drum, which is most recently performed, and the number of driving times of the clothes treating device 1, which is performed until now, may be displayed below the above text in a shape of a gauge.

For example, the number of driving times of the clothes treating device 1, which is performed until now after the previous tub washing, may be displayed below the above text in a shape of a gauge. The number of driving times of the clothes treating device 1 may be displayed on the display unit 4 as the information stored in the memory 830 provided in the clothes treating device 1 is received in the external terminal 2.

At this time, the gauge may be displayed to be filled with a color in accordance with the number of driving times of the clothes treating device 1. Therefore, if the number of driving times of the clothes treating device 1 is the same as the number of driving times which is previously set (for example, 30 times), the gauge may be displayed to be filled with a color.

The user may easily determine a preferable washing timing of the washing tub (drum or tub) through the gauge displayed on the first partition D1 and a text such as "tub washing required". Also, recommended information on a drying mode may be displayed on the second partition D2. In more detail, information as to which one of indoor drying, outdoor drying and drying based on a drying function of the clothes treating device 1 is preferable may be displayed on the second partition D2 together with information on an external environment such as humidity, temperature and weather.

The external terminal 2 may receive the information such as humidity, temperature and weather from the external server 9 through Wi-Fi communication. It is preferable that a previously set drying mode based on the information of the external environment such as humidity, temperature and weather is stored in the external server 9 or the memory module 6. Therefore, the user may easily determine which mode is preferable to dry clothes after completing washing, in accordance with the information on the drying mode displayed on the D2.

Also, a text such as pollen index and "allergy alert" which is previously set based on the pollen index may be displayed on the third partition D3. At this time, the pollen index may be displayed in a type such as very high, high, normal, or low. Therefore, the user may easily determine whether to use a specific course such as an allergy care course in accordance with the pollen index and the allergy alert, which are displayed on the third partition D3.

Also, an icon such as "App guide" which describes a use method of a clothes treating application stored in the memory module 6 of the external terminal 2 may be displayed on the fourth partition D4. Therefore, if the user does not know the use method of the clothes treating device 1 through an application of the external terminal 2, the user may touch the icon to display the use method of the application on the display unit 4.

Also, information of one or more recommended courses based on the information of the external environment may be displayed on the fifth partition D5. That is, information of one or more recommended courses based on at least one of season, weather, humidity, temperature, dust concentration and pollen index may be displayed on the fifth partition D5.

For example, a recommended course based on the information of the external environment among courses that can be selected through the course selection unit and recommended courses (for example, tub washing course, allergy care course, and drying function course) recommended through the first partition D1 to the third partition D3 may be displayed on the fifth partition D5. At this time, the user may select one or more of desired courses of the recommended courses displayed on the fifth partition D5 through a touch of the display unit 4.

Therefore, the user may easily determine preferable courses based on the external environment with reference to the recommended courses displayed on the fifth partition D5. Also, the user may drive the clothes treating device 1 through the manipulation of the execution input unit 33 provided in the course selection unit 30 of the clothes treating device 1 after selecting one or more desired courses of the recommended courses displayed on the fifth partition D5.

Also, a whole recommended washing mode based on the information displayed on the first partition D1 to the fifth partition D5 may be displayed on the sixth partition D6. For example, information related to weather, information related washing of a washing tub (tub or drum), information related to pollen index, and information related to a drying mode may be displayed on the sixth partition D6 in a depiction type sentence.

Therefore, the user may determine a preferable washing and drying mode with reference to the text described in the sixth partition D6 even without reading the information displayed on the first partition D1 to the fifth partition D5 of the display unit 4 one by one. That is, the user may display information, which covers the information displayed on the first partition D1 to the fifth partition D5, on the sixth partition D6 in a depiction type sentence.

Figure 6:
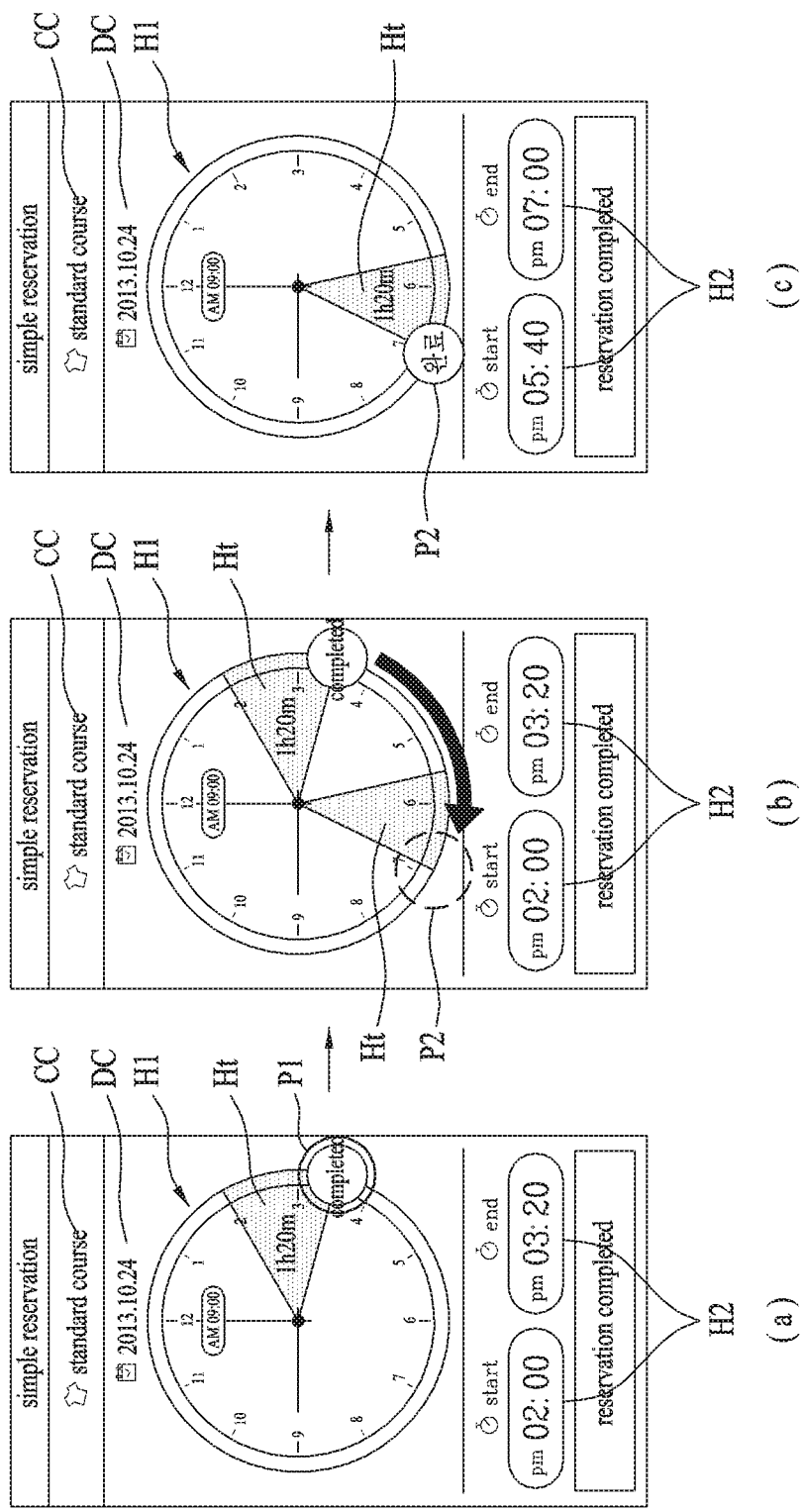
FIG. 6 shows views illustrating a reservation setup method through a display unit of an external terminal according to the present invention.

Hereinafter, a reservation setup method through the display unit of the external terminal will be described with reference to FIG. 6. FIGS. 6(a) to 6(c) are views illustrating a reservation setup method through a display unit 4 of an external terminal 2 according to the present invention.

If a desired course is input through the recommended courses displayed on the course selection unit 30 of the clothes treating device 1 or the external terminal 2, the operation start time and the operation end time of the clothes treating device 1 according to the input course are displayed on the display unit 4 of the external terminal 2 in a type of an analog clock H1 (that is, a type of a clock having hands) as shown in FIG. 6(a). At this time, the operation start time and the operation end time of the clothes treating device 1 may be displayed below the analog clock H1 in a type of a digital clock H2. A washing start time and a washing end time may be displayed based on the current time.

Meanwhile, in the analog clock H1 displayed on the display unit 4, a whole clothes treating time Ht may be displayed as a space between the start time and the end time is lighted in a fan shape. The user may easily determine the operation start time of the clothes treating device, the operation end time of the clothes treating device, and the whole clothes treating time with reference to the analog clock H1 or the digital clock H2 displayed on the display unit 4.

Also, referring to FIG. 6(b), the user may change the clothes treating end time by touching or dragging the portion where the whole clothes treating time Ht is displayed and lighted in a fan shape on the display unit 4. In more detail, a text such as "completed" is displayed on the portion indicating the end time in the analog clock H1, and the user may change the clothes treating end time by touching the above text and dragging to reach a desired position (time). For example, the user may reserve and set driving of the clothes treating device 1 by touching and dragging the above text from a first position P1 of the text "completed" initially displayed on the display unit 4 to a second position P2 of a desired clothes treating end time. Meanwhile, referring to FIG. 6(c), if the user releases the touch after changing the end time through the touch and drag of the analog clock H1, the start time and the end time displayed on the digital clock H2 are changed correspondingly. At this time, the clothes treating start time and end time are only changed, and the whole clothes treating time is not changed. The user may cancel or complete a reservation by touching a "cancellation" or "reservation completed" touch unit (button) displayed on the digital clock H2.

Meanwhile, on a reservation setup screen displayed on the display unit 4, the user may change a course and driving of the clothes treating device 1 to a desired date through a course change (CC) unit and a date change (DC) unit. As described above, the user may easily set an operation reservation time or reservation date of the clothes treating device 1 by touching or dragging a part of the analog clock H1 displayed on the display unit 4.

Meanwhile, in the description made with reference to FIG. 6(a), if a desired course is input through the recommended courses displayed on the course selection unit 30 of the clothes treating device 1 or the external terminal 2, the operation start time and the operation end time of the clothes treating device 1 according to the input course is displayed on the display unit 4 of the external terminal 2. However, since the operation start time and the operation end time of the clothes treating device 1 are displayed for reservation setup, the operation start time and the operation end time may be displayed through an input (that is, touch of reservation setup button) of a separate reservation setup button displayed on the display unit 4.

Figure 7:
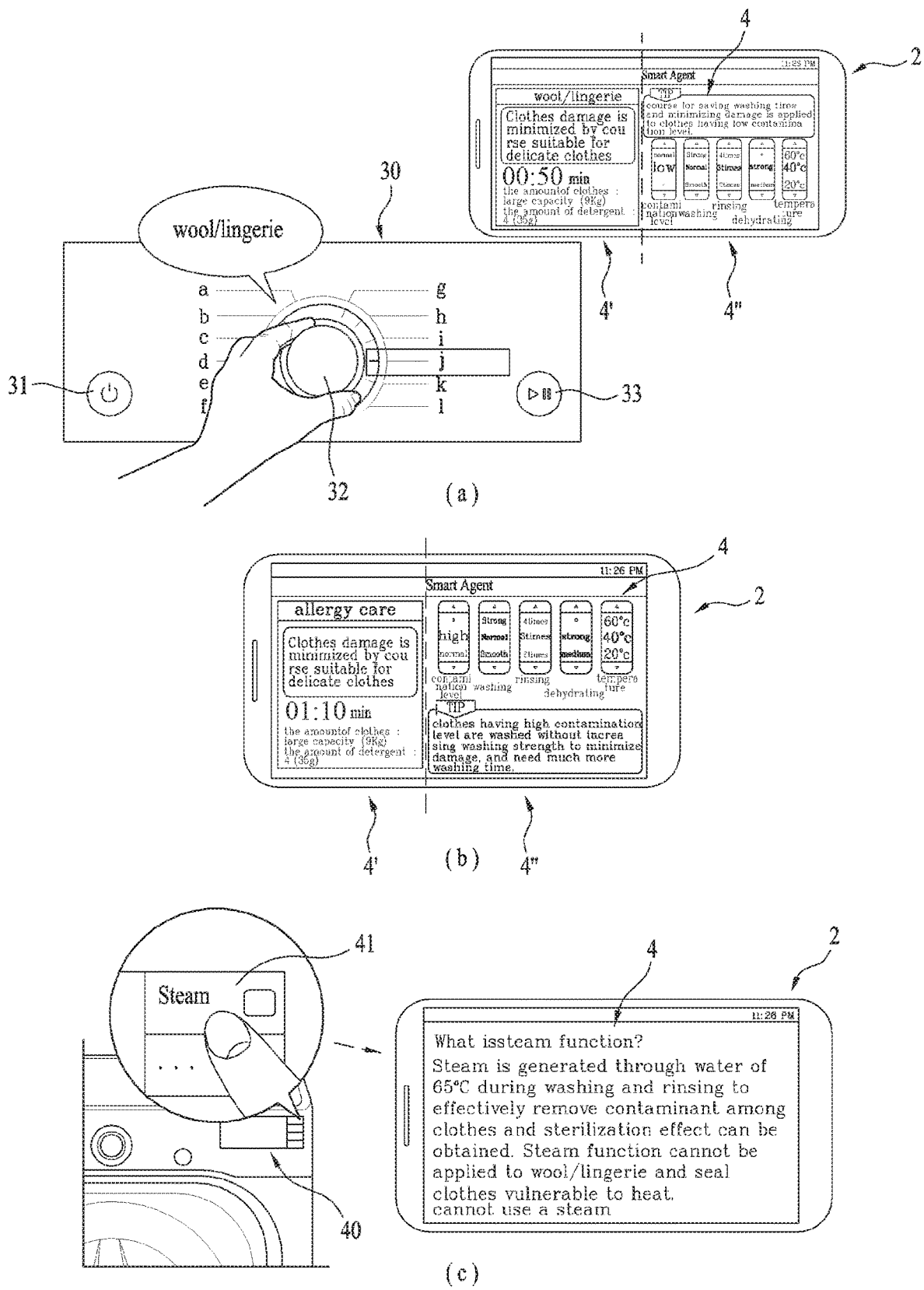
FIG. 7 shows views illustrating a state that description of a course selected by a user is displayed on a display unit of an external terminal according to the present invention.
Figure 8:
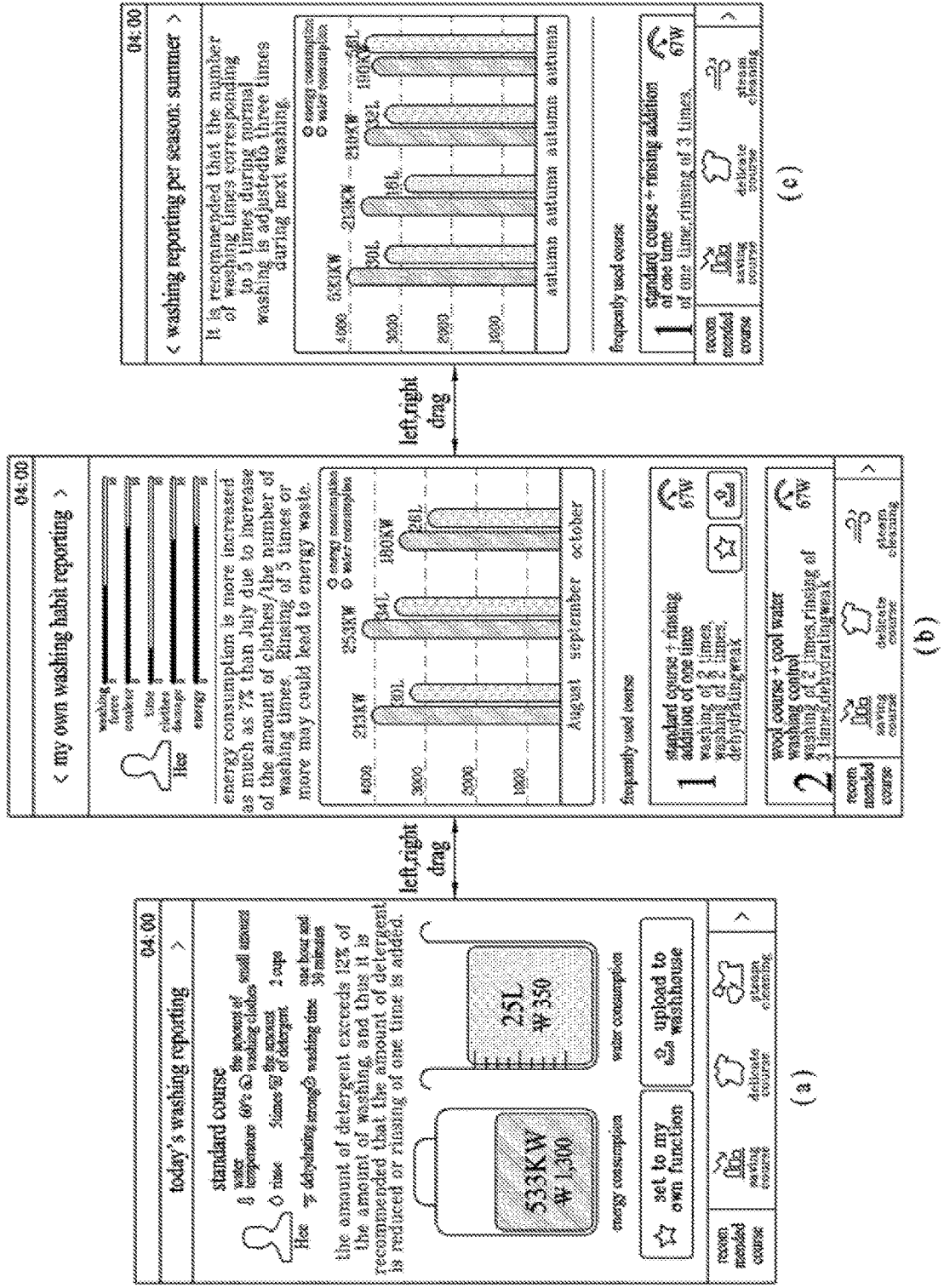
FIG. 8 shows views illustrating a state that a use history of a clothes treating device of a user is displayed on a display unit of an external terminal according to the present invention.

Hereinafter, real time manual display will be described in detail with reference to FIG. 7. FIGS. 7(a) to 7(c) are views illustrating a state that description of a course selected by a user is displayed on a display unit of an external terminal according to the present invention.

First of all, as shown in FIG. 7(a), if the user selects a specific course 1 (for example, wool/lingerie course) by manipulating the manipulation unit 32 of the course selection unit 30, the information on the course selected by the user may be displayed on the display unit 4 of the external terminal 2. Also, setup factors which are previously set may be displayed on the display unit 4 in accordance with each course. The setup factors may include a contamination level, washing strength, the number of rinsing times, dehydrating strength, and a washing water and rinsing water temperature.

The display unit 4 may be partitioned by a first display unit (or first display) 4' and a second display unit (or second display) 4". The information on the course may be displayed on the first display unit 4' and the information of the setup factors may be displayed on the second display unit 4".

Also, description of the clothes treating effect according to the setup factors may further be displayed on the second display unit 4". Also, information on the whole clothes treating time (that is, whole washing time) according to the selected course, the amount of clothes and the amount of the detergent may further be displayed on the first display unit 4'. Therefore, the user may easily obtain description of clothes treating function and effect according to the selected course and information on the whole washing time through the external terminal 2 even without a separate manual text.

Meanwhile, referring to FIG. 7(b), the user may change the setup factors displayed on the second display unit 4" by input or touch. For example, if the user changes a contamination level of the setup factors displayed on the second display unit 4" to "high", the whole clothes treating time displayed on the first display unit 4' and the clothes treating effect according to the setup factors displayed on the second display unit 4" are changed correspondingly.

Therefore, the user may receive the changed course or description of the setup factor in real time whenever the course or the setup factor is changed. Also, referring to FIG. 7(c), if the user inputs a "steam" input unit 41 (that is, pushes a steam button) provided on the display unit 40 of the clothes treating device 1, a detailed description of the steam function such as effect and notes of the steam function is displayed on the display unit 4 of the external terminal 2.

At this time, the information displayed on the display unit 4 of the external terminal 2 may be provided simultaneously with description based on voice. As described above, the user may easily obtain description of the functions provided in the clothes treating device 1 through the external terminal 2 in real time even without reading a separate manual text, whereby user convenience is increased.

FIGS. 8(a) to 8(c) are views illustrating a state that a use history of a clothes treating device of a user is displayed on a display unit of an external terminal according to the present invention. Referring to FIGS. 8(a) to 8(c), if driving of the clothes treating device 1 is completed, the use history of the clothes treating device 1 may be displayed on the external terminal 2.

At this time, the use history of the clothes treating device may include at least one of information on energy consumption, water consumption and the amount of the detergent at a use date of the clothes treating device, information on energy consumption, water consumption and a frequently selected course for a predetermined period, and information on energy consumption, water consumption and a frequently selected course according to season. First of all, if driving of the clothes treating device 1 is completed, the use history (for example, today's washing reporting) of the current date as shown in FIG. 8(a) may first be displayed.

The use history of the current date, which is displayed on the display unit 4, may include a text indicating propriety of the detergent amount which is used and also indicating that additional rinsing is required. At this time, if the concentration of the detergent, which is sensed during the last rinsing course through the detergent concentration sensor 150 provided in the clothes treating device 1, is a previously set concentration or more, a text indicating that additional rinsing is required due to the large amount of the detergent may be displayed on the display unit 4.

Meanwhile, a page (for example, today's washing reporting) where the information according to the use date is displayed, a page (for example, today's washing habit reporting) where the information according to the predetermined period is displayed, and a page (for example, washing reporting per period) where the information according to season is displayed may respectively be displayed on the display unit of the external terminal as separate pages by the touch and drag of the display unit of the external terminal. In more detail, the user may change the page of the information displayed on the display unit 4 through the touch and drag of the display unit 4.

For example, if the user touches the display unit 4 and drags the display unit 4 to a left side, the page of the information according to the predetermined period as shown in FIG. 8(b) is displayed. At this time, if the user again touches the display unit 4 and drags the display unit 4 to a left side, the page of the information according to season as shown in FIG. 8(c) is displayed.

On the page of the information according to the predetermined period as shown in FIG. 8(b), the use history of the clothes treating device for recent three months may be displayed monthly. At this time, a text (for example, rinsing of five times or more corresponds to energy waste) for a preferable washing method may be displayed on the display unit 4 by comparison between monthly energy consumption and monthly water consumption. The monthly energy consumption may be compared and determined by the control module 5 of the external terminal 2 as the data stored in the memory 830 of the clothes treating device are transmitted to the memory module 6 of the external terminal 2.

Also, on the page of the information according to season as shown in FIG. 8(c), a current season (for example, summer) may be displayed. At this time, a text (for example, washing of three times is recommended) for a preferable washing method may be displayed on the display unit 4 by comparison between seasonal energy consumption and seasonal waster consumption. The monthly energy consumption may be compared and determined by the control module 5 of the external terminal 2 as the data stored in the memory 830 of the clothes treating device are transmitted to the memory module 6 of the external terminal 2.

Also, it is preferable that classification of season according to month is previously set in the memory 830. Moreover, on the page of the information according to the predetermined period and the page of the information according to season as shown in FIGS. 8(b) and (c), a frequently used course for the predetermined period and a frequently used course for the current season (for example, summer) may be displayed together.

At this time, the frequently used courses may be displayed based on the number of used times in due order for one or more courses. Also, the frequently used course for the current season may be determined a use history of the clothes treating device of the same season (that is, summer) of a previous year based on the current timing.

Through the use history of the clothes treating device described as above, the user may easily receive the need of a current additional rinsing course, information of a frequently used course, and information of monthly or seasonal energy consumption and water consumption. Hereinafter, various embodiments for a control method of the clothes treating device according to the present invention will be described with reference to the other drawings.

Figure 9:
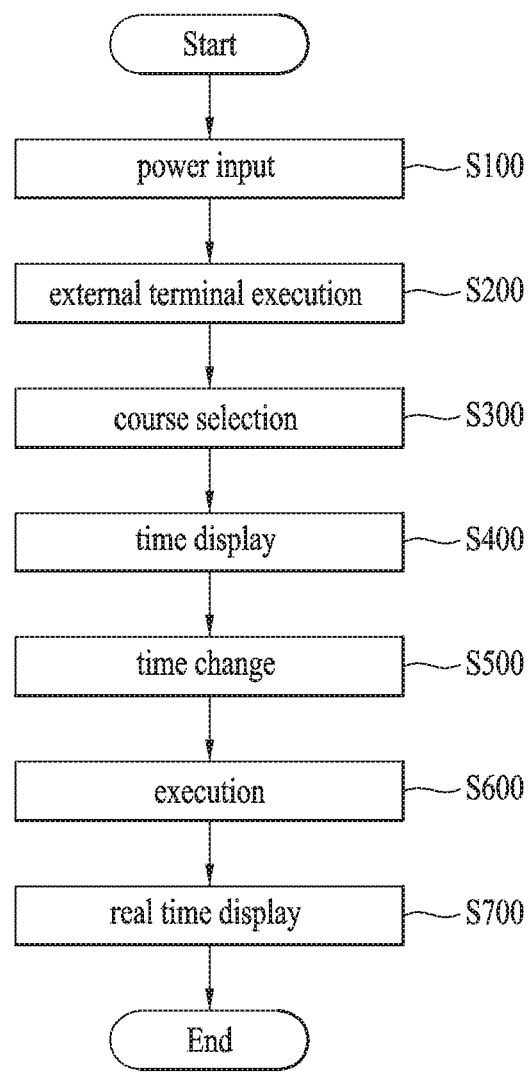
FIG. 9 is a flow chart illustrating a control method of a clothes treating system according to one embodiment of the present invention.

FIG. 9 is a flow chart illustrating a control method of a clothes treating system according to one embodiment of the present invention. Referring to FIG. 9, the control method of the clothes treating system according to one embodiment of the present invention includes a power input step S100 for inputting a power source to the clothes treating device, an external terminal executing step S200 for executing a clothes treating application provided in the external terminal 2, a course selecting step S300 for selecting a course through the course selection unit 30 or a clothes treating application of the external terminal 2, and an executing step S600 for inputting an execution command through the execution input unit 31.

At this time, at the external terminal executing step S200, one or more recommended courses are displayed on the external terminal 2, and at the course selecting step S300, a desired one of the one or more recommended courses displayed on the external terminal 2 may be selected by the user. Also, it is preferable that the one or more recommended courses are set based on the information on the external environment, which includes at least one of season, weather, humidity, temperature, dust concentration and pollen index.

Meanwhile, the control method of the clothes treating system according to one embodiment of the present invention further includes a real time display step S700 for displaying an operation state of the clothes treating device 1 on the external terminal in real time after the executing step S600. Therefore, the user may obtain information on a course and cycle performed by the clothes treating device 1 in real time from the external terminal 2.

Also, the control method of the clothes treating system according to the present invention may further include a time display step S400 for displaying a clothes treating time according to the course selected at the course selecting step S300 on the external terminal and a time change step for changing a clothes treating end time through a touch and drag of the time displayed on the external terminal 2, between the course selecting step S300 and the executing step S600. At this time, the time displayed on the external terminal may be displayed in a type of an analog clock.

Therefore, the user may change the clothes treating end time through a touch and drag of the time displayed on the external terminal 2 that enables a touch input. That is, the user may easily set an operation reservation time of the clothes treating device 1 in accordance with a touch and drag of the display unit 4 of the external terminal 2.

Meanwhile, at the external terminal executing step S200, the external terminal 2 needs to log in the external server 9. This log-in procedure will be described in detail with reference to FIG. 10.

Figure 10:
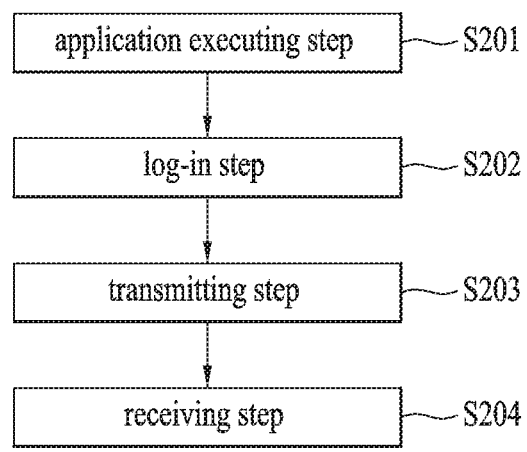
FIG. 10 is a flow chart added to FIG. 7 to illustrate a control method of a clothes treating system according to one embodiment of the present invention.

FIG. 10 is a flow chart added to FIG. 9 to illustrate a control method of a clothes treating system according to one embodiment of the present invention. In more detail, FIG. 10 is a flow chart illustrating a communication function of an external terminal 2 and an external server 9. Referring to FIG. 10, the external terminal executing step S200 shown in FIG. 9 may include an application executing step S201 for executing a clothes treating application, a log-in step S202 for logging in the external server 9 through the external terminal 2, a transmitting step S203 for transmitting information on an external environment and information on one or more recommended courses from the external server 9 to the external terminal 2, and a receiving step S204 for displaying the information, which is received in the external terminal 2 from the external server 9, on the external terminal 2.

At the application executing step S201, the clothes treating application provided in the external terminal 2 may be executed. At this time, the clothes treating application may be executed by manipulation of the external terminal by the user or touch of the clothes treating application displayed on the display unit of the external terminal by the user.

Meanwhile, since the external terminal 2 and the clothes treating device 1 are formed to perform NFC communication, if the external terminal 2 is close to the clothes treating device 1 at a predetermined distance or less, the clothes treating application may be formed to be automatically executed by the external terminal 2. For example, if the external terminal 2 is held in the holder unit 50 provided in the clothes treating device 1, a clothes treating application program provided in the external terminal 2 may be executed automatically.

Also, at the log-in step S202, user information and clothes treating device information, which are previously stored in the memory module 6 of the external terminal 2, may be transmitted to the external server 9 through Wi-Fi communication. At this time, the external server 9 may be recognized that the clothes treating application is executed through the external terminal 2 on the basis of the user information and the clothes treating device information.

Also, at the transmitting step S203, the information on the external environment and the information on one or more previously set recommended courses, which are stored in the external server 9, may be transmitted to the external terminal 2. At this time, the information of the external environment, which is stored in the external server 9, may be updated in real time or a predetermined time interval (interval of about 5 minutes), and the information which is most recently updated, is preferably transmitted from the external server 9 to the external terminal 2.

Also, at the receiving step S204, the external terminal 2 receives the information on the external environment and the information on one or more recommended courses from the external server 9 and displays the corresponding information on the display unit 4. Therefore, the user may easily determine which course is proper in accordance with the external environment such as season and weather through the information of the recommended course displayed on the external terminal.

Figure 11:
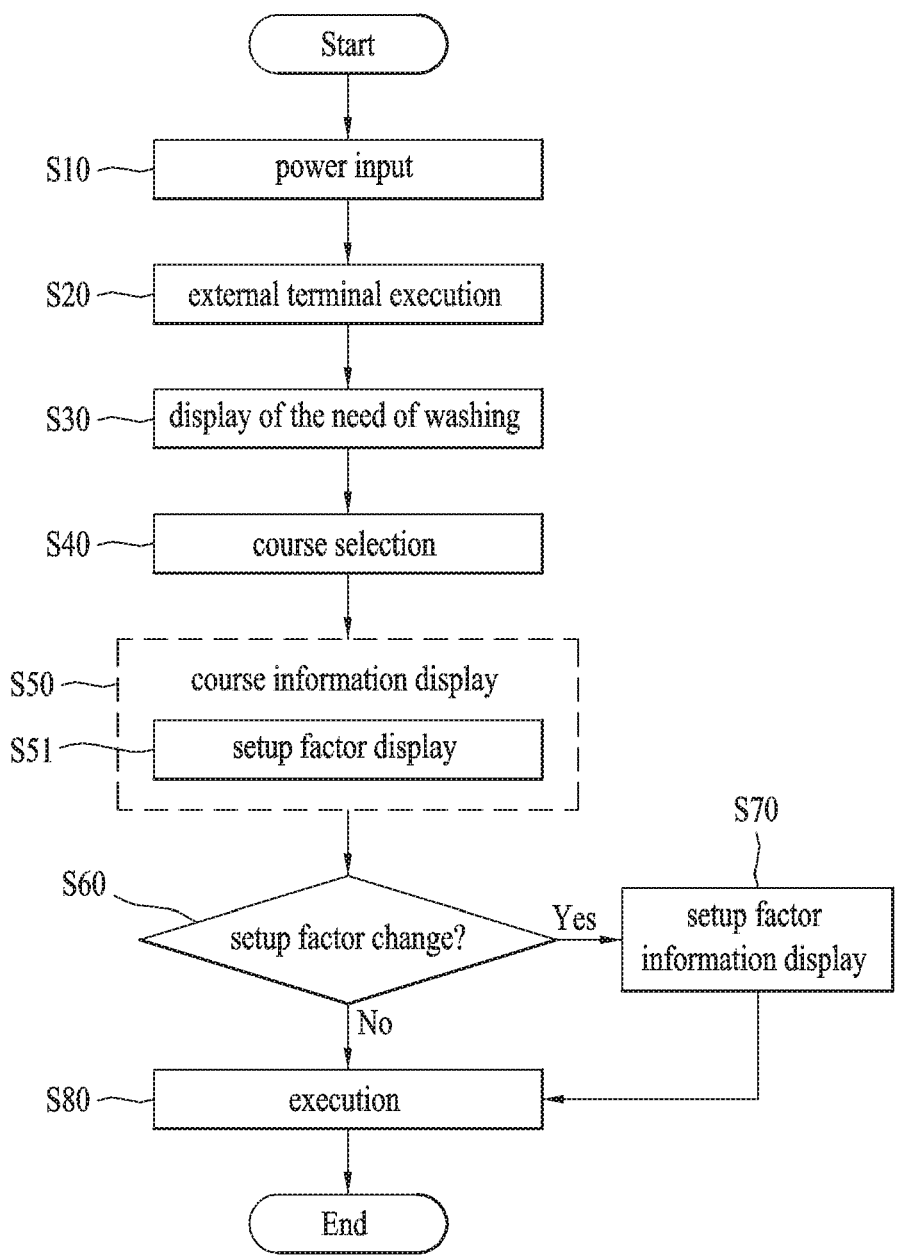
FIG. 11 is a flow chart illustrating a control method of a clothes treating system according to another embodiment of the present invention.

FIG. 11 is a flow chart illustrating a control method of a clothes treating system according to another embodiment of the present invention. Referring to FIG. 11, the control method of the clothes treating system according to another embodiment of the present invention includes a power input step S10 for inputting a power source to the clothes treating device, an external terminal executing step S20 for executing a clothes treating application provided in the external terminal 2, a course selecting step S40 for selecting a course through the course selection unit 30 or a clothes treating application of the external terminal 2, a course information display step S50 for displaying information on the course selected through the course selection unit 30 on the display unit 4 of the external terminal 2, and an executing step S80 for inputting an execution command through the execution input unit 31.

The information on the course may include at least one of detailed description of the course selected through the course selection unit 30, clothes treating effect by the selected course, notes during clothes treating according to the selected course, and clothes treating prediction time according to the selected course. Also, the information on the course may be displayed on the display unit 4 of the external terminal 2 in real time in accordance with manipulation of the course selection unit 30 by the user. Therefore, the user may easily obtain the information such as function and effect of each course through the external terminal 2 in real time while manipulating the course selection unit 30 provided with a plurality of courses.

At the external terminal executing step S20, the clothes treating device related application provided in the external terminal 2 may be executed. If the clothes treating device related application is executed, the external terminal 2 may replace a manual text of the clothes treating device 1 with the clothes treating device related application.

At the course selecting step S40, the user may select a desired clothes treating course through the course selection unit 30 or the clothes treating application of the external terminal 2. Meanwhile, the course information display step S50 may include a setup factor display step S51 for displaying setup factors which include one or more of a contamination level, washing strength, the number of rinsing times, dehydrating strength and washing water temperature, on the display unit 4 of the external terminal 2.

At this time, it is preferable that the information on the course selected by the user and the setup factors are simultaneously displayed on the display unit 4 of the external terminal 2. For example, the display unit 4 may be partitioned into two portions, wherein the information on the selected course may be displayed on one of the two portions and the setup factors may be displayed on the other portion.

At this time, the description such as function and effect of the displayed setup factors may be displayed on the portion where the setup factors are displayed. Also, the display unit 4 of the external terminal 2 is a touch screen type display unit which enables a touch input by the user, and the setup factors displayed on the display unit 4 may be changed by the touch of the user.

The control method of the clothes treating system according to the present invention may further include a setup factor change determining step S60 for determining whether the setup factor displayed on the display unit 4 has been touched or changed by the user. At the setup factor change determining step S60, if the control module 5 determines that a specific setup factor is touched or change by the user, the control method may further include a setup factor information display step S70 for displaying information on the touched or changed setup factor on the display unit 4 of the external terminal 2.

At the setup factor change determining step S60, when the user changes the setup factor through the touch of the display unit 4, information on the changed setup factor may be displayed on the display unit 4 in real time. Therefore, the user may receive description of function and effect according to the changed setup factor in real time while changing the setup factor through the external terminal 2.

At this time, the information on the setup factors may include at least one of detailed description of the touched or changed setup factor, clothes treating effect according to the setup factors, notes during clothes treating according to the setup factors, and clothes treating prediction time according to the setup factors. At the setup factor change determining step S60, if the specific setup factor is not touched or changed by the user, the executing step S80 may be performed by the user without change of the information displayed on the display unit 4.

Meanwhile, the information on the course and the information on the setup factors may previously be stored in the memory module 6 of the external terminal 2. Also, the information on the course and the information on the setup factors may be stored in the external server 9, and the external terminal 2 may receive the information on the course and the information on the setup factors from the external server 9 through Wi-Fi communication.

Also, the information on the course and the information on the setup factors, which are stored in the external server 9, may be updated at a predetermined period, and the updated information on the course and the updated information on the setup factors may be transmitted to the external terminal 2. The information on the course and the information on the setup factors may be displayed on the display unit 4 under the control of the control module 5 of the external terminal 2.

Meanwhile, the control method of the clothes treating system according to the present invention may further include a washing need display step S30 for displaying information on the need of washing of the tub 100 or the drum 200 between the external terminal executing step S20 and the course selecting step S40. That is, if a power source is input to the clothes treating device 1 and an application related to the clothes treating device is executed in the external terminal 2, the information on the need of washing of the tub 100 or the drum 200 may be displayed on the external terminal 2.

That is, the information on the need of washing of the tub 100 or the drum 200 is displayed on the external terminal 2 before the course selecting step S40 for selecting a course by the user. The need of washing of the tub or the drum may be determined based on at least one of the washing timing of the tub or the drum, which is most recently performed, and the number of driving times of the clothes treating device 1, which is performed until now.

The external terminal 2 may be formed to receive at least one of the washing timing of the tub or the drum, which is most recently performed, and the number of driving times of the clothes treating device 1, which is performed until now, from the clothes treating device 1 through NFC communication and display the received information on the display unit 4. In this case, the number of driving times for washing of the tub 100 or the drum 200 is excluded (that is, not counted) from the number of driving times of the clothes treating device 1.

At this time, it is preferable that the washing timing of the tub 100 or the drum 200, which is most recently performed, and the number of driving times of the clothes treating device 1, which is performed until now, are stored in the memory 830 provided in the control unit 800. That is, the controller 810 may transmit the stored information on the washing timing of the tub 100 or the drum 200, which is most recently performed, and the stored information on the number of driving times of the clothes treating device 1, which is performed until now, to the external terminal 2, and the corresponding information may be displayed on the display unit 4 of the external terminal 2.

Also, the external terminal 2 may be formed to display the information on the need of washing of the tub 100 or the drum 200 on the basis of at least one of the information on the washing timing of the tub 100 or the drum 200, which is most recently performed, and the information on the number of driving times of the clothes treating device 1, which is performed until now. For example, the external terminal 2 may further include a memory module 6 and a control module 5. Information on a previously set washing period of the tub 100 or the drum 200 and information on the number of driving times of the clothes treating device, which is previously set, may be stored in the memory module 6.

Therefore, if the external terminal 2 receives the information on the washing timing of the tub 100 or the drum 200, which is most recently performed, from the clothes treating device 1, the control module 5 determines whether a period from the washing timing to a current time exceeds the previously set washing period stored in the memory module 6. If the control module 5 determines that the period from the washing timing to the current time exceeds the previously set washing period stored in the memory module 6, the control module 5 displays a text (for example, "tub washing required" or "drum washing required") of the need of washing of the tub 100 or the drum 200 on the display unit 4. At this time, the previously set washing period may previously be set to 30 days, 50 days or 100 days.

Also, if the external terminal 2 receives the information on the number of driving times of the clothes treating device 1, which is performed until now, from the clothes treating device 1, the control module 5 compares the number of driving times with the number of previously set driving times stored in the memory module 6. And, the control module 5 controls the display unit 4 to display whether the number of driving times of the clothes treating device 1 is close to the number of previously set driving times stored in the memory module 6, on the display unit 4.

At this time, the number of previously set driving times may previously be set to 10 times, 30 times or 50 times. Also, after the tub 100 or the drum 200 is washed, the number of driving times of the clothes treating device 1 is again counted from the beginning (that is, from 1). By the aforementioned configuration, the user may easily determine whether to perform washing of the tub or the drum before the specific course is executed through the clothes treating device (that is, before washing the clothes), on the basis of the information displayed on the display unit 4 of the external terminal 2.

Also, according to the control method of the clothes treating system according to the present invention, a manual text which describes a use method of the clothes treating device and function and effect according to each course may be replaced simply by the external terminal. Also, if the user manipulates the clothes treating device in a state that the external terminal 2 is held in the holder unit 50 of the clothes treating device 1, information on function and effect per course or setup factor of the clothes treating device 1 may easily be provided from the external terminal 2 in real time. In this case, the external terminal 2 may serve to substitute for the display unit 40 of the clothes treating device 1.

The present invention is not limited to the aforementioned embodiments, and it will be apparent to those skilled in the art that the present invention can be embodied in other specific forms without departing from the spirit and essential characteristics of the invention. The scope of the invention should be determined by reasonable interpretation of the appended claims and all change which comes within the equivalent scope of the specification are included in the scope of the invention.

The invention claimed is:

1. A clothes treating system comprising:
an external terminal including a display; and
a clothes treating device formed to be able to communicate with the external terminal, the clothes treating device including:
a power button;
a course selector configured to select one of a plurality of predetermined courses; and
an execution button to drive the clothes treating device in accordance with the selected course, wherein the external terminal is configured to display information on an external environment including season, weather, humidity, temperature, and at least one of dust concentration or pollen index and one or more recommended courses previously set on the basis of the information on the external environment, after a power command is input through the power button, but before an execution command is input through the execution button, and the external terminal is configured to display drying recommended information on one of indoor drying, outdoor drying, or drying based on a drying function of the clothes treating device on the basis of the information on the external environment.

2. The clothes treating system according to claim 1, wherein the clothes treating device includes a holder to hold the external terminal.

3. The clothes treating system according to claim 2, wherein the clothes treating device is powered ON if a power source is input through the power button or the external terminal is held in the holder.

4. The clothes treating system according to claim 1, wherein each of the clothes treating device and the external terminal includes an NFC module for NFC communication.

5. The clothes treating system according to claim 4, wherein the clothes treating device includes a cabinet forming an external appearance, a tub received in the cabinet, and a drum rotatably provided inside the tub, and the external terminal is configured to receive at least one of a most recent washing time of the tub or the drum, and a number of driving times of the clothes treating device from the clothes treating device through NFC communication and display the received information.

6. The clothes treating system according to claim 5, wherein the external terminal is configured to display information on a need of washing of the tub or the drum on the basis of at least one of the most recent washing time and the number of driving times of the clothes treating device.

7. The clothes treating system according to claim 1, further including an external server storing data of the information on the external environment and data on the previously set one or more recommended courses according to the external environment, wherein the external terminal is configured to enable Wi-Fi communication with the external server, and is configured to receive the data of the information on the external environment and the data on the previously set one or more recommended courses according to the external environment from the external server.

8. The clothes treating system according to claim 1, wherein the information on the external environment and the previously set one or more recommended courses according to the external environment are displayed on the external terminal before the course selector is manipulated by a user.

9. The clothes treating system according to claim 1, wherein the external terminal is configured to display information on the course selected in accordance with a manipulation of the course selector on the display.

10. The clothes treating system according to claim 9, wherein the information on the course includes at least one of a description of the course selected through the course selector, clothes treating effect by the selected course, notes during clothes treating according to the selected course, or clothes treating prediction time according to the selected course.

11. The clothes treating system according to claim 9, wherein the information on the course is displayed on the display in accordance with the manipulation of the course selector in real time.

12. The clothes treating system according to claim 1, wherein a use history of the clothes treating device is displayed on the external terminal if driving of the clothes treating device is completed.

13. The clothes treating system according to claim 12, wherein the use history of the clothes treating device includes at least one of information on energy consumption, water consumption and the amount of a detergent at a use date of the clothes treating device, information on energy consumption, water consumption and a frequently selected course for a predetermined period, or information on energy consumption, water consumption and a frequently selected course according to a season.

* * * * *